Jan. 7, 1969    I. J. McALISTER ET AL    3,420,325
VEHICLE LOAD WEIGHING DEVICE
Filed April 6, 1966
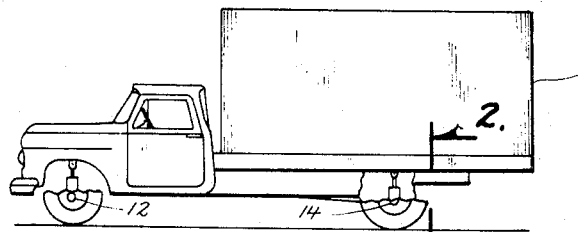
Fig. 1
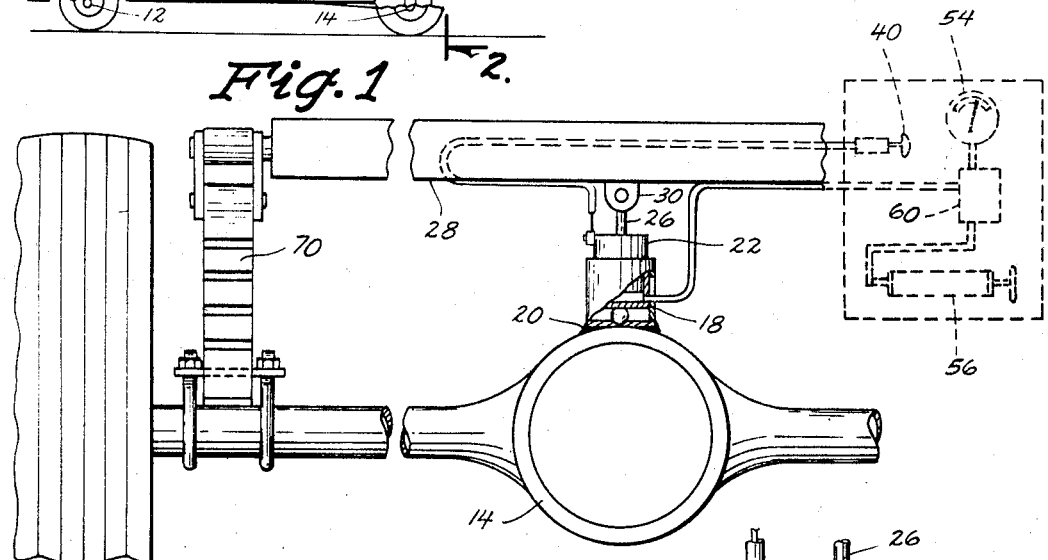
Fig. 2
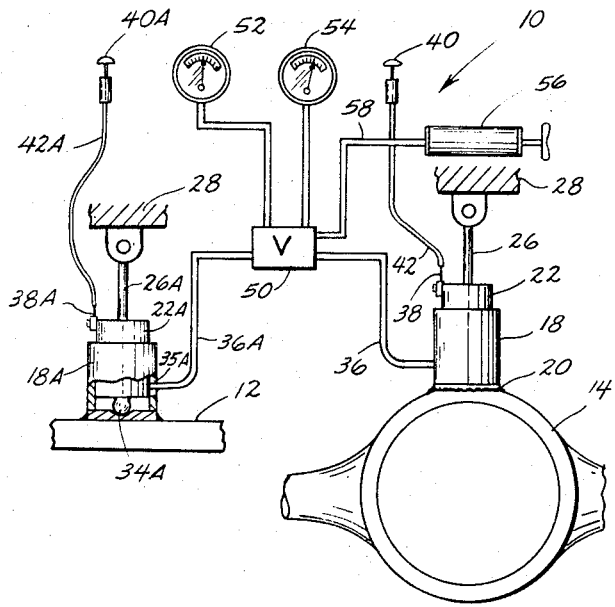
Fig. 3
Fig. 4
INVENTORS
IRIS J. McALISTER
JIMMIE D. McALISTER
MERLE R. LODER
BY
Dick, Zarley, McKee & Thomte
ATTORNEYS 3,420,325
VEHICLE LOAD WEIGHING DEVICE
Iris J. McAlister and Jimmie D. McAlister, both of Bayard, Iowa 50029, and Merle R. Loder, Jewell, Iowa 50130
Filed Apr. 6, 1966, Ser. No. 540,538
U.S. Cl. 177—137                 7 Claims
Int. Cl. G01g 19/10

ABSTRACT OF THE DISCLOSURE

The device and method of measuring the net weight on each axle of a vehicle having a plurality of axles comprising the steps disposing a compressive pressure responsive piston and cylinder assembly with an associated pressure gauge between the frame and each axle, then imposing pressure in each cylinder and piston assembly until the reading on the associated gauge corresponds to the dead weight of the vehicle frame on each respective axle and finally loading the vehicle until the desired weight on each axle has been reached as indicated on each of the respective gauges.

---

State laws generally specify maximum live loads which may be carried by the truck and further stipulate how much weight can be carried on each of the truck's axles. The weight of the truck includes two main components, the dead weight of the truck and the live load weight. The truck's dead weight is indicated by the manufacturer or can be determined by weighing the truck empty, one axle at a time is desired. When the live load is added to the truck, it must be so distributed that the total weight is limited to the maximum amount permitted by the regulations for each axle and this may be determined by use of the weighing system of this invention.

As the load is being transported across the country, the truck will have to be weighed at weighing stations located along most truck routes.

At a weighing station, the trucker will be penalized for axles which are carrying weights in excess of the maximum limit set by the law.

Therefore, one of the principal objects of this invention is to provide a vehicle load weighing device wherein the load on each of the truck axles may be readily ascertained.

It is a further object of this invention to provide a vehicle load weighing device which can readily be rendered inoperative when the vehicle is being operated.

A still further related object of this invention is to provide a vehicle load weighing device which involves a manually operable cylinder assembly which will operate at low air pressures.

Yet another object of this invention is to provide a vehicle load weighing system which includes independent weight assemblies for each of the axles of the vehicle.

A still further object of this invention is to provide a vehicle load weighing device including a piston and cylinder wherein the cylinder is movably received in a guide sleeve carried on the axle of the vehicle; and related to this object is the object that the cylinder be manually retractable on the piston away from the bottom of the guide sleeve such that relative movement between the cylinder and the sleeve may occur without damaging the weighing device.

A still further related object of this invention is to provide a vehicle load weighing device which is pivotally connected to the frame and thereby lateral rocking or pivoting of the frame will not place undesirable stress on the piston and cylinder assembly.

Another related object of this invention is to provide a vehicle load weighing device which functions only as a gauge and in no way serves to perform a part of the suspension system.

Yet another object of this invention is to provide a vehicle load weighing system which will permit readily determining the live or dead load on any number of axles in a vehicle.

A further object of this invention is to provide a vehicle load weighing device which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side elevation view of a truck having portions broken away to illustrate the vehicle load weighing device on the front and rear axles of the truck;

FIG. 2 is a fragmentary elevational view taken along line 2—2 in FIG. 1 illustrating the vehicle load weighing device between the frame and the rear axle;

FIG. 3 is a schematic view of the vehicle load weighing system for use on a two-axle vehicle; and FIG. 4 is an enlarged cross-sectional view of the piston and cylinder assembly of the vehicle load weighing device.

The vehicle load weighing system of this invention is referred to generally in FIG. 3 by the reference numeral 10 and is shown in FIG. 1 mounted on the front and rear axles 12 and 14 respectively of a truck 16.

In FIG. 2, a sleeve 18 is shown secured to the rear axle by weld 20 or the like and is adapted to movably receive a cylinder 22. A piston 24 connected to a piston rod 26 is mounted in the cylinder 22 and extends upwardly where it is pivotally connected to the vehicle frame 28.

The sleeve 18 is sufficiently large to serve as a guide sleeve for the cylinder 22. A guide concave recess 30 is formed in the base 32 of the sleeve 18 and is adapted to matingly receive a ball element 34 mounted on the lower end of the cylinder 22.

A vertically disposed slot 35 is formed in the side wall of the sleeve 18 and is adapted to receive a conduit 36 connected to the cylinder 22 at a point between the piston 24 and the lower end of the cylinder.

When there is no air pressure in the cylinder 22, a flexible cable 38 connected to the sleeve 22 at one end and having a handle 40 at the other end may be operated to lift the cylinder 22 upwardly away from the base 32 of the sleeve 18 and the axle 14 to the dash line position shown in FIG. 4. The flexible cable 38 extends through a flexible conduit 42 appropriately secured to the vehicle.

The vehicle load weighing device on the front axle 12 is identical in its components to the device on the rear axle 14 and therefore is referred to by the same reference numerals with the addition of the letter A.

The air conduits 36 and 36A are each connected to a valve 50 which in turn is connected to a pair of guages 52 and 54. The guage 52 is in direct communication with the conduit 36A while the guage 54 is in direct communication with the conduit 36 such that the pressure in the cylinders 36A and 36 respectively is registered on the guages 52 and 54.

A manually operated air pump 56 is provided and is connected through a conduit 58 which is connected to the valve unit 50 for providing air pressure to the cylinders 22 and 22A.

The preferred location of the control equipment is in the cab of the vehicle. This would include the guages 52, 54 and the hand controls 40 and 40A for the lift cables, and the air pump 56. However, if desired, the controls may be located anywhere on the truck such as shown by the dash lines in FIG. 2 wherein the controls are shown schematically located near the rear axle 14 and include the air pump 56, a valve unit 60 and the guage 54. Also, the cylinder lift cable handle 40 is located with the other controls.

As also seen in FIG. 2, the frame 28 is conventionally connected to the axle 14 by leaf springs 70.

Thus in operation it is readily seen that by selectively pumping air into the cylinders 22 and 22A until the guages 54 and 52 correspond in pounds to the dead weight of the truck a live load may then be added to the truck and so distributed such that the loaded truck shows no more than the maximum weight on each of the axles as indicated by the guages 54 and 52 for the rear and front axles 14 and 12 respectively. Upon completing the loading of the truck to the desired weight on each of the one or more axles, the pressure in the cylinders may be removed and the hand cables 40 and 40A operated to lift the cylinders 22 and 22A upwardly to the position shown by the dash lines in FIG. 4 thereby eliminating any stress on the cylinders 22, 22A as the truck is being driven. The air inlet conduits 36 and 36A may move within the slots 35 and 35A.

When the cylinders are extended relative to the pistons the ball elements 34 and 34A on the bottom ends of the cylinders will be guided into the concave recesses in the bases of the sleeves thereby permitting a maximum amount of movement between the weighing device and the axles of the vehicle. Moreover, should the frame 28 of the vehicle tend to pivot laterally about its longitudinal axis there will be no stress on the vehicle load weighing system 10 since it is pivotally connected to the frame 28 about an axis parallel to the longitudinal axis of the vehicle frame 28.

It is thus seen that the vehicle load weighing device may be used on tandem wheel trucks or trucks with any number of wheel axles and that the load weighing system includes components for each axle which operate independently of the components for the other axles. The pressure in the respective air pressure lines 36 and 36A will have to be adjusted individually to obtain the desired reading on the guages 54 and 52 depending on the dead weight load of the truck on each of its axles. Once these settings have been made however the guages will correctly indicate the weight on the axles as the live load is placed on the truck frame. Accordingly, it is conveniently possible through the use of this veihcle load weighing system to accurately determine the dead and live weight on each axle of the truck and thereby avoid violation of any laws governing the maximum weights that may be placed on individual axles of a truck.

Some changes may be made in the construction and arrangement of our vehicle load weighing device without departing from the real spirit and purpose of our invention, and it is our intention to cover by our claims, any modified forms of structure or use of mechanical equivalents which may be reasonably included within their scope.

We claim:

1. In combination with a vehicle having a frame, an axle means, supporting wheels operatively secured to said axle means, and a movable suspension means connecting said axle means to said frame, an axle load weighing device comprising,
    a compressible pressure responsive means extending between said frame and said axle means,
    a gauge means,
    a circuit connecting said pressure responsive means and said gauge means,
    means for imposing pressure in said circuit and said pressure responsive means,
    a calibrated scale means on said gauge whereby said gauge will reflect change in pressure in said circuit occasioned by the movement of said suspension means by a load imposed on said frame, and
    a guide sleeve provided on said axle to receive said cylinder.

2. The structure of claim 1 wherein said piston is pivotally connected to said axles.

3. The structure of claim 1 wherein a ball and socket connection is provided between said guide sleeve and said cylinder.

4. The structure of claim 3 wherein said ball is on the outer end of said cylinder and said socket is in the bottom end of said sleeve.

5. The structure of claim 1 and said means for imposing pressure in said circuit operates on air pressure and includes a pump means connected to said circuit.

6. The structure of claim 1 wherein said pressure responsive means is a cylinder and piston assembly.

7. The structure of claim 1 wherein control means is secured to said pressure responsive means to selectively remove said pressure responsive means from an operative compresive poition with repect to said frame and said axle means.

References Cited

UNITED STATES PATENTS

| | | | |
|---|---|---|---|
| 601,339 | 3/1898 | Freeman | 177—209 |
| 1,147,128 | 7/1915 | Troll | 177—137 XR |
| 1,179,962 | 4/1916 | Richards | 177—137 |
| 1,227,505 | 5/1917 | Troll | 177—136 |
| 1,432,631 | 10/1922 | Sonnlechner et al. | 177—138 |
| 1,864,876 | 6/1932 | Westrum | 177—137 |
| 2,472,689 | 6/1949 | Adams et al. | 177—209 XR |
| 2,490,860 | 12/1949 | Donaldson | 177—138 |
| 2,769,967 | 11/1956 | Lukocevich | 177—137 XR |
| 2,867,433 | 1/1959 | Bergenheim et al. | 177—141 XR |
| 3,017,938 | 1/1962 | Polich | 177—141 |
| 3,145,795 | 8/1964 | Tate | 177—208 |

FOREIGN PATENTS

| | | |
|---|---|---|
| 506,076 | 5/1920 | France. |
| 808,648 | 7/1951 | Germany. |
| 905,111 | 9/1962 | Great Britain. |

ROBERT S. WARD, JR., *Primary Examiner.*

U.S. Cl. X.R.

177—141, 154, 209